United States Patent [19]

Misawa et al.

[11] Patent Number: 5,145,754
[45] Date of Patent: Sep. 8, 1992

[54] SOLID OXIDE FUEL CELL

[75] Inventors: Hidenobu Misawa, Toyoake; Hirotake Yamada, Nagoya, both of Japan

[73] Assignee: NGK Insulators, Ltd., Japan

[21] Appl. No.: 651,973

[22] Filed: Feb. 7, 1991

[30] Foreign Application Priority Data

Feb. 15, 1990 [JP] Japan .................................. 2-32382

[51] Int. Cl.$^5$ .............................................. H01M 8/10
[52] U.S. Cl. ........................................ 429/32; 429/30; 429/31; 429/34
[58] Field of Search ............... 429/30, 31, 32, 38, 429/34

[56] References Cited

U.S. PATENT DOCUMENTS

| | | | |
|---|---|---|---|
| 4,476,197 | 10/1984 | Herceg | 429/32 |
| 4,476,198 | 10/1984 | Ackerman et al. | 429/32 |
| 4,499,663 | 2/1985 | Zwick et al. | 429/32 |
| 4,883,497 | 11/1989 | Claar et al. | 429/33 |

FOREIGN PATENT DOCUMENTS 0286360 10/1988 European Pat. Off. .
1-124964 5/1989 Japan .

OTHER PUBLICATIONS

Patent Abstracts of Japan, vol. 13, No. 371 (E-807) [3719], Aug. 17, 1989.
Patent Abstracts of Japan, vol. 13, No. 410 (E-819) [3758], Sep. 11, 1989.

*Primary Examiner*—William R. Dixon, Jr.
*Assistant Examiner*—Willie J. Thompson
*Attorney, Agent, or Firm*—Parkhurst, Wendel & Rossi

[57] ABSTRACT

A solid oxide fuel cell includes a plurality of flat plate-like laminates spaced substantially in parallel with one another. One surface of each of the laminates is covered with a flat air electrode film, while the other surface is covered with a flat fuel electrode film. The fuel cell further includes a plurality of oxidizing gas flow passages each arranged between the adjacent laminates and facing the flat air electrode film, a plurality of fuel gas flow passages each arranged between the adjacent flat laminates and facing the flat fuel electrode films and at least air electrode films, solid electrolyte films and fuel electrode films interposed between the oxidizing and fuel gas flow passages. Oxidizing gas supply pipes are each extended from an opening at one end of each of the oxidizing gas flow passages into the gas flow passage, and closure members each close the other end of the oxidizing gas flow passage. Fuel gas supply pipes are each extending from an opening at one end of each of the fuel gas flow passages into the gas flow passage, and closure members each close the other end of the fuel gas flow passage.

9 Claims, 4 Drawing Sheets

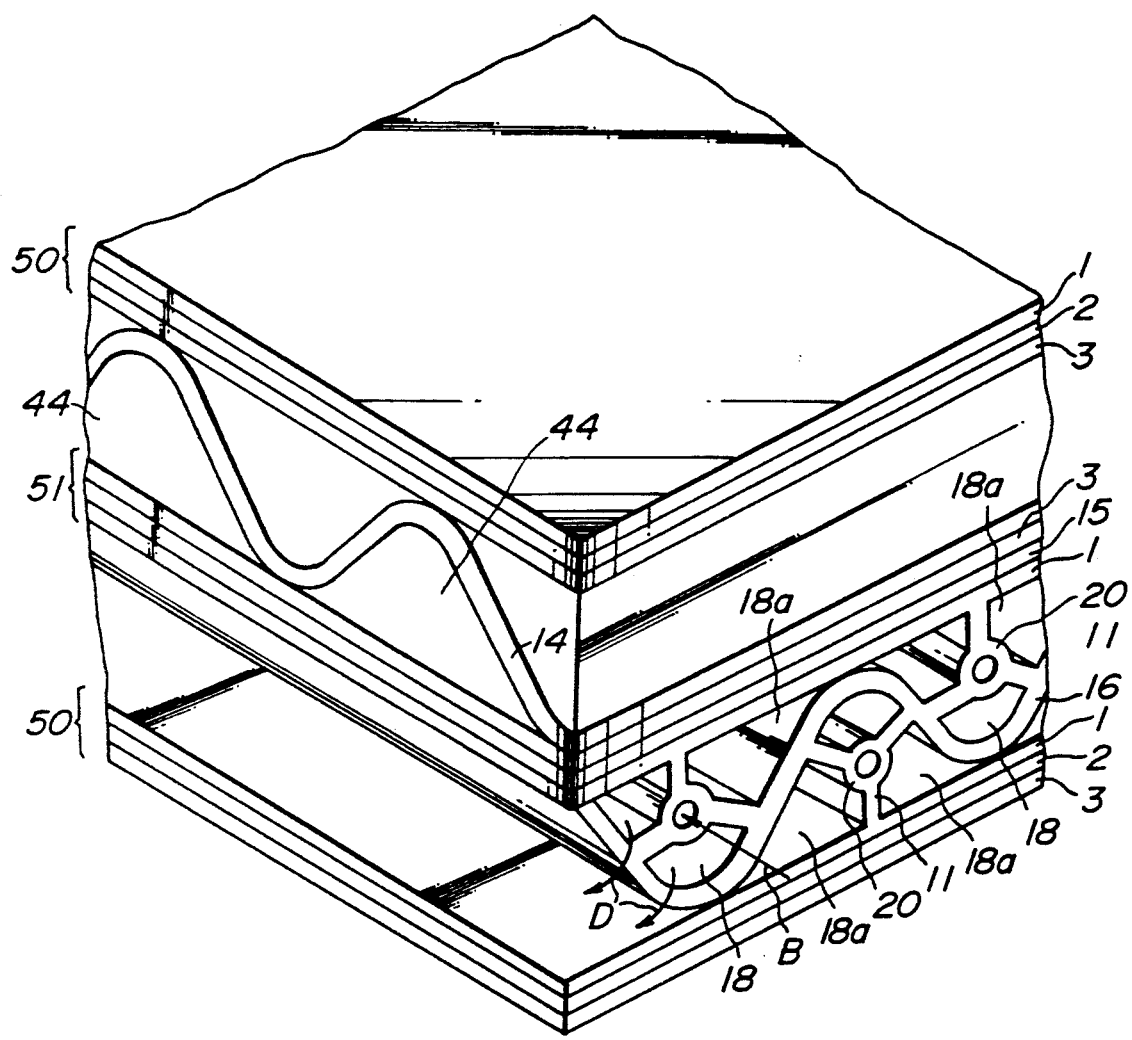
FIG_4

FIG._5 PRIOR ART
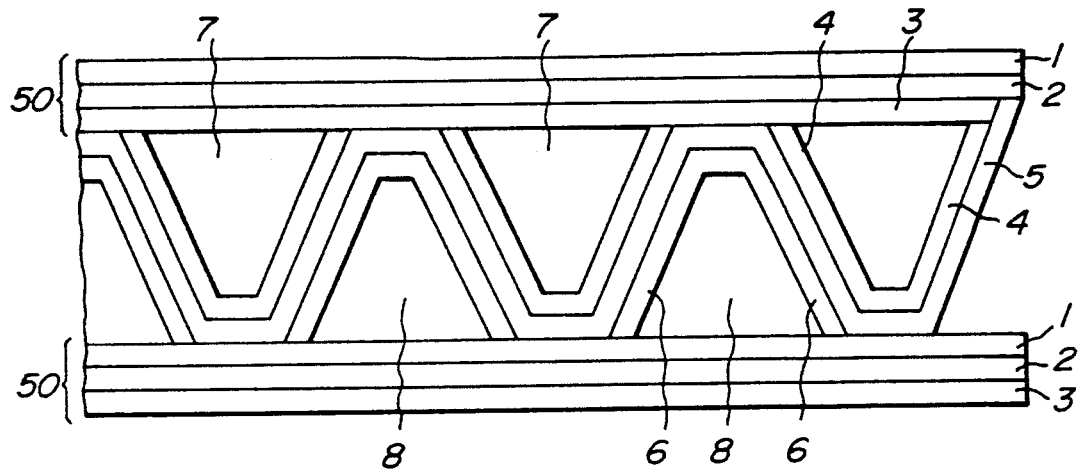
FIG._6 PRIOR ART
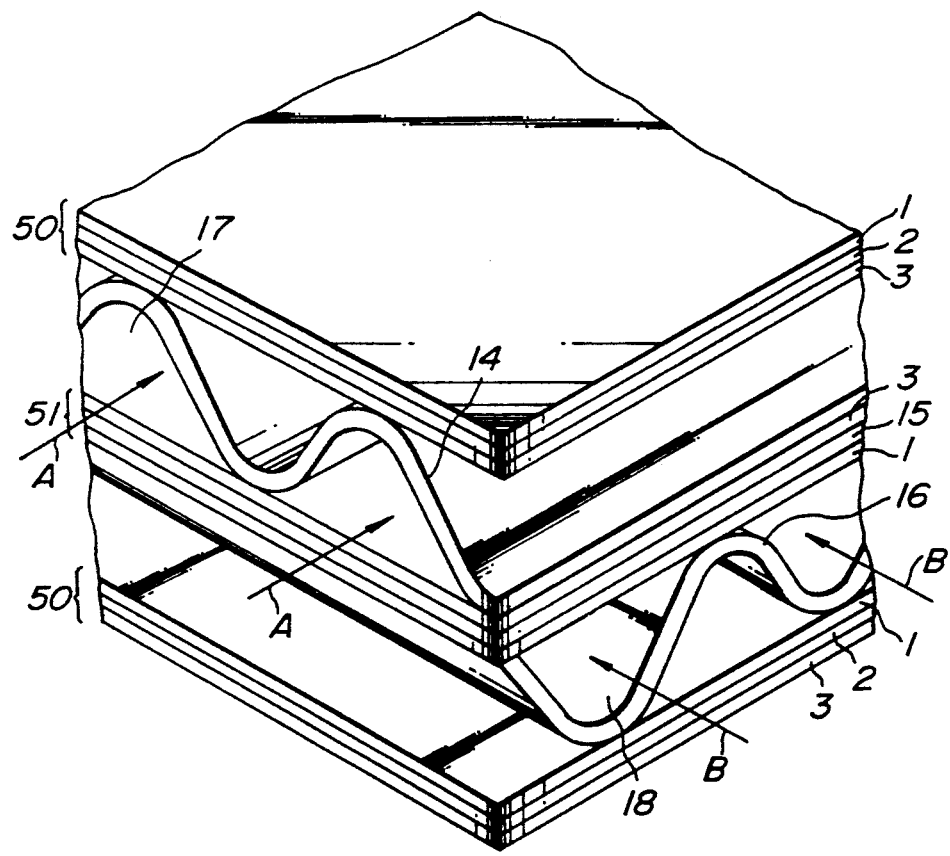

SOLID OXIDE FUEL CELL

BACKGROUND OF THE INVENTION

1. Field of the Invention

The present invention relates to solid oxide fuel cells.

2. Related Art Statement

Recently, fuel cells have been recognized as power generating equipment. Since the fuel cell is a device capable of directly converting chemical energy possessed by fuel to electrical energy, and the fuel cell is free from any limitation of Carnot's cycle, the cell is a very promising technique owing to its high energy conversion efficiency, wide latitude of fuels to be used (naphtha, natural gas, methanol, coal reformed gas, heavy oil and the like), less public nuisance, and high electric power generating efficiency without being affected by scale of installations.

Particularly, as the solid oxide fuel cell (referred to as "SOFC" hereinafter) operates at high temperatures of 1,000° C. or more, reaction on electrodes is extremely high. Thus, catalyst of a noble metal such as expensive platinum is necessary. In addition, since the SOFC has low polarization and relatively high output voltage, its energy conversion efficiency is conspicuously higher than that in other fuel cells. Furthermore, since their constituent materials are all solid, the SOFC is stable and has long use life.

In general, the SOFC is composed of an air electrode, a solid electrolyte and a fuel electrode.

FIG. 5 is a partial front elevational view illustrating one example of such a solid oxide fuel cell. This SOFC is of a monolithic design referred to as "Co-flow model" of Argonne type first proposed by Argonne National Laboratory.

As shown in FIG. 5, with the SOFC of this type, a flat plate-like air electrode film 1, an interconnector 2 and a flat plate-like fuel electrode film 3 are arranged in this order from above to below to form a flat plate-like laminate 50. Such flat plate-like laminates 50 are then arranged in parallel with one another with a predetermined interval. A number of fuel electrode films 4, which have a substantially V-shaped section as shown in the drawing, are arranged in opposition to the flat plate-like fuel electrodes 3 to form a number of fuel gas flow passages 7 in a direction orthogonal to the paper as viewed in the drawing. Moreover, a number of air electrode films 6, which have an inverted V-shaped section, are provided in opposition to the flat plate-like air electrode films 1 to form a number of oxidizing gas flow passages 8 in a direction orthogonal to the paper. These fuel gas flow passages 7 and the oxidizing gas flow passages 8 are combined with one another in the form of a mosaic, and a wavy solid electrolyte film 5 is formed between the fuel electrode films 4 and the air electrode films 6. Between the adjacent fuel gas flow passages 7 and oxidizing gas flow passages 8 are interposed the fuel electrode film 4, the wavy solid electrolyte film 5 and the air electrode film 6 in this order. The power generation is performed among these films. Although the films are shown only in one row for the sake of simplicity in FIG. 5, a number of the laminates shown in FIG. 5 are piled one upon another to form a number of gas flow passages in the form of a honeycomb.

FIG. 6 illustrates a SOFC of the Argonne type which is similar to that of FIG. 5, but referred to as "Cross flow model".

This SOFC is composed of flat plate-like laminates 50 and 51 alternately laminated. The former laminate 50 is similar to that shown in FIG. 5, and the laminate 51 is formed by arranging successively a flat plate-like fuel electrode film 3, a flat plate-like solid electrolyte film 15 and a flat plate-like air electrode film 1 arranged in parallel with one another with a predetermined interval. In each space between the two flat plate-like fuel electrode films 3 is arranged a wavy fuel electrode film 14 to form fuel gas flow passages 17 into which a fuel gas is supplied as shown by arrows A. On the other hand, in each space between the two flat plate-like air electrode films 1 is arranged a wavy air electrode film 16 to form oxidizing gas flow passages 18 into which an oxidizing gas is supplied as shown by arrows B. The fuel gas flow passage 17 and the oxidizing gas flow passage 18 are crossed by a predetermined angle, for example, 90°. Between the fuel gas flow passages 17 and the oxidizing gas flow passages 18 there are interposed a flat plate-like fuel electrode film 3, a flat plate-like solid electrolyte film 15 and a flat plate-like air electrode film 1 in this order. The power generation is performed in these interposed films.

Inasmuch as such a monolithic solid oxide fuel cell of the Argonne type needs no inert structural support members, it exhibits a high output density and a high energy density, and has a wide active surface area. Therefore, it is expected, as a promising technique, which can improve its electrical power generating efficiency.

With the construction having the number of oxidizing gas flow passages and the fuel gas flow passages in the form of a honeycomb, however, it is very difficult to appropriately supply the oxidizing gas and the fuel gas into the respective flow passages and to prevent any leakage and mixing of the oxidizing gas and the fuel gas. Still less, lack of suitable gas supplying means makes it difficult to put the technique to practical use.

SUMMARY OF THE INVENTION

It is an object of the invention to provide a solid oxide fuel cell comprising a number of oxidizing gas flow passages and fuel gas flow passages provided in the form of a honeycomb structure, which can suitably supply the oxidizing gas and the fuel gas into these passages, and prevent any leakage and mixing of these oxidizing and fuel gases.

In order to accomplish this object, the present invention provides a solid oxide fuel cell comprising a plurality of flat plate-like laminates spaced substantially in parallel with one another, each of the laminates having one surface covered with a flat plate-like air electrode film and the other surface covered with a flat plate-like fuel electrode film, a plurality of oxidizing gas flow passages arranged between the adjacent flat plate-like laminates and facing the flat plate-like air electrode film, a plurality of fuel gas flow passages arranged between the adjacent flat plate-like laminates and facing the flat plate-like fuel electrode film, and at least air electrode films, solid electrolyte films and fuel electrode films interposed between the oxidizing gas flow passage and the adjacent fuel gas flow passage. Oxidizing gas supply pipes are each extended from one end opening of each of the oxidizing gas flow passages into the interior thereof, closure members each close the other end of each of the oxidizing gas flow passage, fuel gas supply pipes are each extended from one end opening of each of the fuel gas flow passages into the interior thereof, and closure members each close the other end of each of the fuel gas flow passages.

In the above, the "air electrode films" are identical with or different from the "flat plate-like air electrode films", and further the "fuel electrode films" are identical with or different from the "flat plate-like fuel electrode films".

In the case that the "air electrode film" and the "fuel electrode film" are the "flat plate-like fuel electrode film" and the "flat plate-like air electrode film", respectively, the "solid electrolyte film" is located between the flat plate-like air electrode film and the flat plate-like fuel electrode film, and constitutes a part of the "flat plate-like laminates". One example of this case is the flat plate-like laminates 51 shown in FIG. 6. Moreover, in the other case that the "air electrode films" and the "fuel electrode films" are different from the "flat plate-like fuel electrode films" and the "flat plate-like air electrode films", respectively, the "solid electrolyte film" does not constitute a part of the "flat plate-like laminate", but is located between the adjacent flat plate-like laminates. One example of this case is the SOFC shown in FIG. 5.

These and other objects, features and advantages of the invention will be appreciated upon reading of the following description of the invention when taken in conjunction with the attached drawings, with the understanding that some modifications, variations and changes of the same will be made by the skilled person in the art to which the invention pertains without departing from the spirit of the invention or the scope of claims appended hereto.

BRIEF DESCRIPTION OF THE DRAWINGS

For a better understanding of the present invention, reference is made to the drawings:

FIG. 4 is a partial perspective view illustrating another embodiment according to the present invention in the form of a Cross flow type SOFC;

FIG. 5 is a partial front elevation illustrating one layer of the Co-flow type SOFC (Argonne type) of the prior art; and FIG. 6 is a partial perspective view illustrating the Cross flow type SOFC (Argonne type) of the prior art.

DETAILED DESCRIPTION OF THE INVENTION

Figure 1:
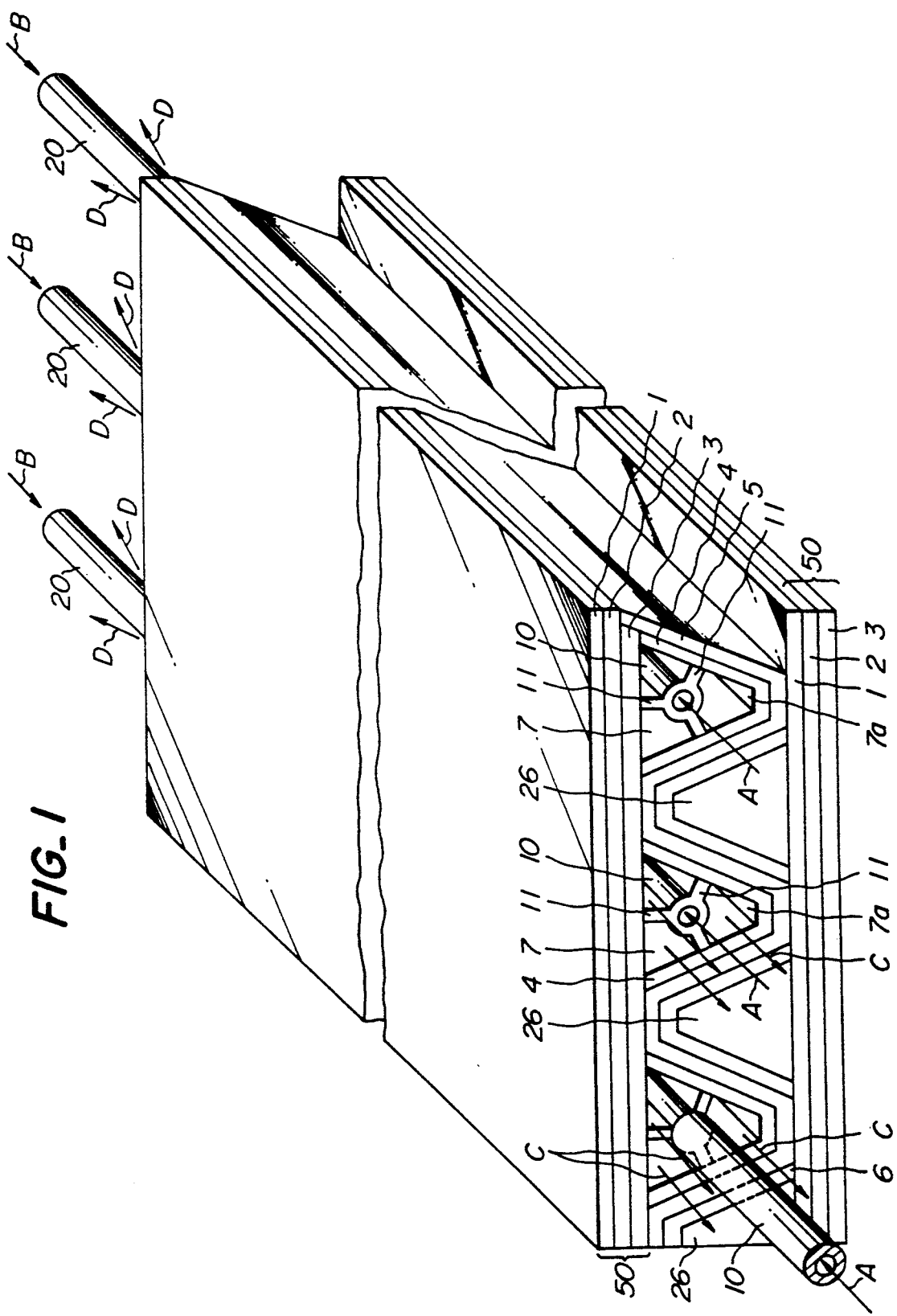
FIG. 1 is a partial perspective view illustrating one embodiment according to the present invention in the form of a Co-flow type SOFC.
Figure 2:
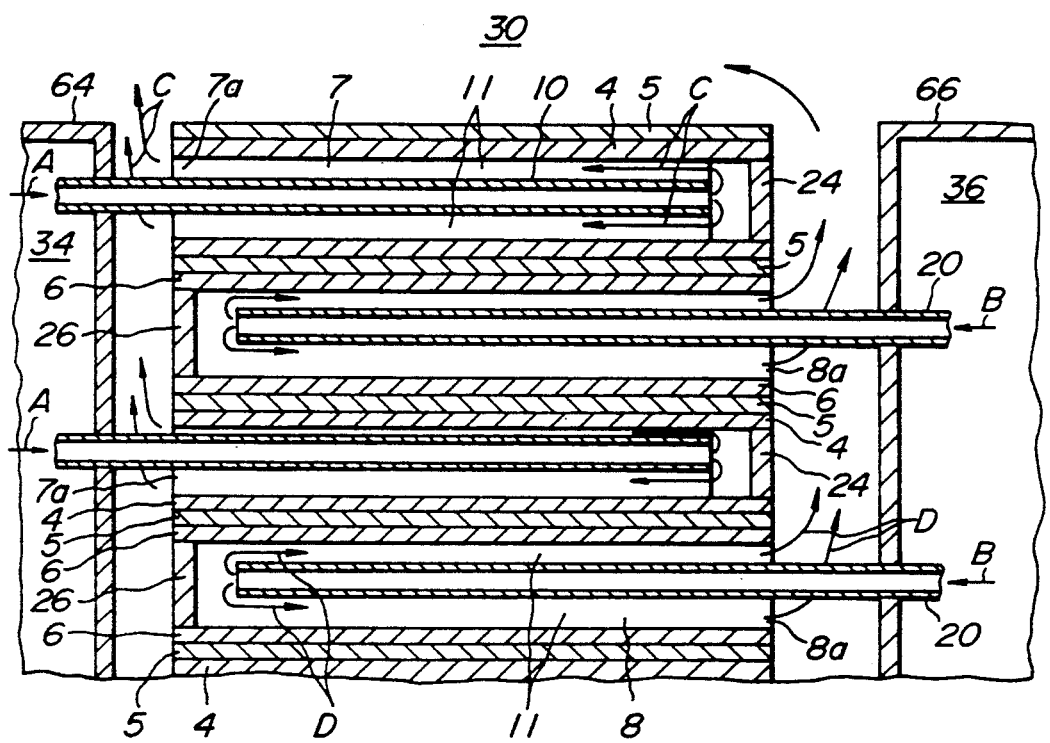
FIG. 2 is a sectional view of the SOFC shown in FIG. 1.

FIG. 1 is a perspective view of the SOFC according to an embodiment of the present invention, showing only part of one layer in an enlarged scale for the sake of convenience in explanation. FIG. 2 is a partial sectional view of this SOFC.

In the SOFC of this embodiment, since the laminate constructions of electrodes, the shape of gas flow passages themselves, etc. are similar to those shown in FIG. 5, explanation thereof is omitted.

In the SOFC of this embodiment, a fuel gas supply pipe 10 is provided extending from an opening 7a at one end (on the side of a viewer in FIG. 1 and on the left side of FIG. 2) of each of fuel gas flow passages 7 to the other end thereof. The fuel gas supply pipe 10 is supported by three radial ribs 11 in this embodiment. The number of the ribs 11 is of course arbitrary. A closure member 24 is provided at the other end of each of the fuel gas flow passages 7 having the fuel gas supply pipe 10 inserted therein, and prevents the fuel gas from escaping therefrom. A base portion of the fuel gas supply pipe 10 is exposed in a fuel gas supply chamber 34 defined by a partition wall 64, and a forward end of the fuel gas supply pipe 10 is fixed close to the closure member 24.

On generating the electric power, a fuel gas is supplied from the fuel gas supply chamber 34 into the fuel gas supply pipes 10. The fuel gas leaves the forward end of the fuel supply pipe 10 and is turned at the closure member 24 in a reverse direction. Then, the fuel gas flows between the fuel gas supply pipe 10 and the fuel electrode 4, and leaves the end opening 7a of the passage 7 as shown by arrows C. This fuel cell is so designed that the fuel gas is caused to flow by pressure difference between an exhaust gas combustion chamber 30 and the fuel gas supply chamber 34. The used fuel gas whose concentration has been lowered owing to utilization for the generation of the electric power is thus caused to flow into the exhaust gas combustion chamber 30.

On the other hand, an oxidizing gas supply pipe 20 is provided extending from an opening 8a at one end of each of the oxidizing gas flow passages 8 toward the other end, and supported by three radial ribs 11. A closure member 26 is provided at the other end of the oxidizing gas flow passage 8 having the oxidizing gas supply pipe 20 inserted thereinto, and prevents the oxidizing gas from escaping. A base portion of the oxidizing gas supply pipe 20 is exposed in an oxidizing gas supply chamber 36 defined by a partition wall 66, and a forward end of the oxidizing gas supply pipe 20 is fixed close to the closure member 26.

On generating the electric power, an oxidizing gas is supplied from the oxidizing gas supply chamber 36 into the oxidizing supply pipes 20 as shown by arrows B. The oxidizing gas leaves the forward ends of the oxidizing gas supply pipe 20 and is turned at the closure member in the reverse directions. The oxidizing gas then flows between the oxidizing gas supply pipe 20 and the air electrode 6, and leaves the end opening 8a as shown by arrows D. This fuel cell is so designed that the oxidizing gas is caused to flow by pressure difference between the exhaust gas combustion chamber 30 and the oxidizing gas supply chamber 36. The used oxidizing gas whose concentration has been lowered owing to utilization for the generation of the electric power is thus caused to flow into the exhaust gas combustion chamber 30.

The oxidizing gas produces oxygen ions at an interface between the air electrode film 6 and the solid electrolyte film 5. These oxygen ions move through the solid electrolyte film 5 into the fuel electrode film 4 where the oxygen ions react with the fuel and emit electrons to the fuel electrode films 4.

An interconnector 2 is provided between the flat plate-like fuel electrode film 3 and the flat plate-like air electrode film 1 to connect respective layers in series. Finally, a load is connected between upper and lower ends of the stack to extract electrical power.

The air electrode films 1 and 6 may be made of $LaMnO_3$, $CaMnO_3$, $LaNiO_3$, $LaCoO_3$, $LaCrO_3$ or the like doped or not doped. Among them, $LaMnO_3$ doped with strontium is preferred. The solid electrolyte films 5 may be generally made of yttria-stabilized zirconia or the like. In general, the fuel electrode films 3 and 4 are preferably made of nickel-zirconia cermet or cobalt-zirconia cermet.

The fuel gas supply pipes 10, the ribs 11 and the closure members 24 may be made of materials different from that of the fuel electrode films 3 and 4 surrounding them, but are preferably made of the same material as that of the electrodes 3 and 4 as described later. The oxidizing gas supply pipes 20, the ribs supporting them and the closure members 26 may also be made of materials different from that of the air electrode films 1 and 6, but are preferably made of the same material as that of the latter.

The SOFC according to this embodiment brings about the following effects.

(1) As above described, the fuel gas and the oxidizing gas can be certainly fed into the entire gas flow passages 7 and 8 with high efficiency by combining the fuel gas supply pipes 10 and the oxidizing gas supply pipes 20 with the closure members 24 and 26 of the gas flow passages provided at the proximity of the open ends of the relevant supply pipes. Consequently, this arrangement solves the problems arising with the supply of the fuel gas and the oxidizing gas into the Argonne type SOFC whose power generating efficiency is high. As a result of this, the practical applicability is enhanced.

(2) The fuel gas and the oxidizing gas having their concentrations lowered owing to electrical reaction are exhausted through the end openings 7a and 8a with the aid of the pressure difference between the exhaust gas combustion chamber and the fuel and oxidizing gas supply chambers, and flow into the exhaust gas combustion chamber 30. Therefore, the end openings 7a and 8a of the gas flow passages 7 and 8, respectively, need no sealing. Accordingly, this arrangement can provide a useful gas supplying-exhausting constructions with enhanced reliability without causing any thermal stresses due to sealing and fixing of the gas supply pipe.

(3) The forward ends of the gas supply pipes 10 and 20 are arranged adjacent the closure members 24 and 26 and inside the gas flow passages 7 and 8. Consequently, fresh fuel and oxidizing gases are prevented from escaping from the end openings 7a and 8a, thereby preventing local heating at the entrances of the gas flow passages.

Moreover, even if the gas should slightly leak through spaces between the partition wall 64, 66 and the gas supply pipe 10, 20, the gas will react only the fuel gas and the oxidizing gas having low concentrations after reaction. Consequently, there is no risk of any explosion of these gases.

(4) All the gas supply pipes 10 and 20 are supported by three ribs 11 so that they are held with high holding strength in a stable condition. Moreover, the gas supply pipes 10 and 20 are exactly located relative to the gas flow passages 7 and 8 with the aid of the ribs 11. Therefore, there are neither difficulty in locating gas supply pipes 10, 20 nor any risk of damage to the gas supply pipes 10 and 20, which would occur in the case that gas supply pipes have to be inserted into the gas flow passages.

In manufacturing the closure members 24 and 26 to be provided at the ends of the gas flow passages, following methods may be employed. For example, after forming the gas flow passages 7, 8 having both ends opened, molds are formed of an organic material or the like at predetermined positions at the ends of the passages 7, 8. A material for the fuel or oxidizing electrode is poured into the molds to form the closure members. Thereafter, firing is effected to burn away the organic material. As an alternative, the closure members 24 and 26 are made and fired separately from the main parts and then attached to the ends of the gas flow passages 7 and 8 by bonding, fixing, pasting and fitting.

There are a number of ways for forming the structure shown in FIG. 1. For example, it is preferable that blocks forming the gas flow passages 7 and 8, respectively, are produced separately, and then combined together.

Figure 3:
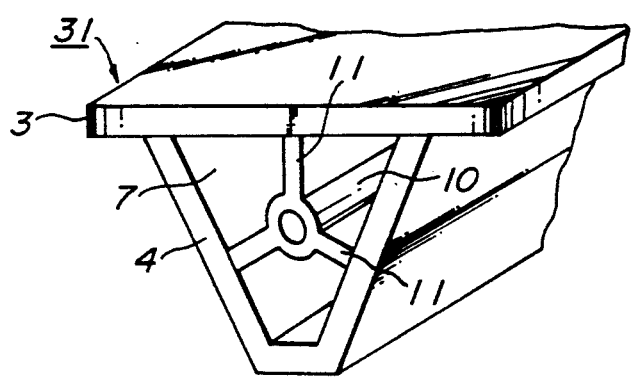
FIG. 3 is a partial perspective view illustrating one block made of a fuel electrode material in the present invention.

That is, as shown in FIG. 3, a fuel electrode material is extruded to form blocks 31 each comprising a flat plate-like fuel electrode film 3, a fuel electrode film 4 having a substantially V-shaped section, three ribs 11 and a fuel gas supply pipe 10. Thereafter, these blocks are fired. An air electrode material is also extruded to obtain similar blocks for air electrodes. The blocks thus produced are successively combined in a mosaic-like fashion with solid electrolyte films 5 and interconnectors 2 to obtain the arrangement shown in FIG. 1. The blocks may be individually fired and then combined, or the blocks may be combined on shaping and then fired.

With such producing methods which use extrusion, it is possible to accurately produce the blocks 31 having a relatively complicated shape including the ribs 11 and the fuel gas supply pipes 10 with high efficiency.

FIG. 4 is a partially cut-away perspective view illustrating an embodiment which is an application of the present invention to the Argonne type cross flow model.

In this embodiment, each of the fuel gas flow passages is provided with a fuel gas supply pipe (not shown) and each of the oxidizing gas flow passages 18 is provided with an oxidizing gas supply pipe 20. These gas supply pipes are each supported by three ribs 11, respectively, in the same manner as in the SOFC shown in FIG. 1. Moreover, each of the gas flow passages is provided with a closure member 44 at the other end (on the side of the fuel gas flow passage) to prevent the gas from flowing out therefrom. In FIG. 4, similar closure members 44 are of course provided for the oxidizing gas flow passages (not shown). In a similar manner to the embodiment of FIG. 1, the oxidizing gas is supplied into the oxidizing gas supply pipes 20 shown by an arrow B. When the oxidizing gas arrives at the closure member (not shown), the gas is turned in the reverse direction so that the oxidizing gas used for generating power with the electrode reaction is emitted through the open end 18a shown by an arrow D. The fuel gas also flows and is then emitted through the fuel gas flow passage in the same manner as the oxidizing gas.

With this embodiment, substantially the same effects can be brought about as those in the SOFC of FIG. 3.

The structure shown in FIG. 4 may be produced by forming blocks through extruding a material for the air electrode and combining the blocks in the same manner as shown in FIG. 3. Each block consists of an oxidizing gas supply pipe 20, three ribs 11 and air electrode films 1 and 16.

While the embodiments of the present invention have been explained, the above embodiments can be modified in various manner as described hereafter.

For example, one gas flow passage may be provided with plural fuel gas supply pipes or oxidizing gas supply pipes, respectively.

Moreover, although the fuel gas and the oxidizing gas are emitted from the forward ends of the fuel gas supply pipe and the oxidizing gas supply pipe, respectively, it may be in the above embodiments that these gas supply pipes may be provided with openings midway along their lengths so that the fuel gas or the oxidizing gas is partially emitted through the openings.

Furthermore, the entire solid oxide fuel cell may be vertically arranged, although horizontally fixed in FIGS. 1 and 4. With the cross flow type SOFC shown in FIG. 4, the fuel gas flow passages and the oxidizing gas flow passages intersect with each other at a predetermined angle in the prior art as indicated by its name. In the application of the present invention, however, it is not necessary to make them intersect with each other. The fuel gas and the oxidizing gas may flow in the reverse directions as shown in FIG. 1 or in the same direction.

Although each of the gas supply pipes is supported by the three ribs in the above embodiments, the number of the ribs is arbitrary. Further, the ribs are not necessarily essential. In the event that such ribs are dispensed with, gas supply pipes made of a ceramic material or corrosion-resistant metal are inserted into corresponding gas flow passages and fixed at determined positions independently from the SOFC main body.

As can be seen from the above explanation, according to the solid oxide fuel cell of the present invention, the oxidizing gas supply pipe is provided in the oxidizing gas flow passage, and this passage has a closed end on the side opposite to the insertion side. On the other hand, the fuel gas supply pipe is provided in the fuel gas flow passage, and this pipe also has a closed end on the side opposite to the insertion side. Therefore, the gas supplied into the oxidizing gas supply pipe or the fuel gas supply pipe is interrupted and turned by the closed end of the supply pipe in the reverse direction so that the oxidizing gas or the fuel gas having reduced concentrations because of the electrode reaction is exhausted from the open end of the oxidizing gas flow passage or the fuel gas flow pipe. Accordingly, the oxidizing gas and the fuel gas can be supplied into the oxidizing gas flow passage and the fuel gas flow passage, respectively, with a great certainty. Consequently, with the solid oxide fuel cell including a plurality of oxidizing gas flow passages and fuel gas flow passages formed between the flat plate-like laminates and operating with high electric power generating efficiency, it is possible to solve the problems arising in case of the supply of the fuel gas and the oxidizing gas and exhaustion of the reacted gases to enhance the practical applicability of the fuel cell.

Moreover, since the oxidizing gas and the fuel gas having reduced concentrations are exhausted from the ends of the oxidizing gas flow passage and the fuel gas flow passage, respectively, fresh oxidizing and fuel gases are prevented from flowing into these ends of the gas flow passages. Therefore, there is no need to independently seal the end openings of the gas flow passages. Since this is effective to enhance the practical applicability of the fuel cell, and the fuel cell is free from stresses and strains due to fixation in the sealing, the fuel cell according to the invention is high in reliability as a structural body.

What is claimed is:

1. A solid oxide fuel cell comprising a plurality of flat plate laminates spaced substantially parallel to one another, each of the laminates having one surface covered with a flat plate air electrode film and another surface covered with a flat plate fuel electrode film, a plurality of oxidizing gas flow passages each arranged between the adjacent flat plate laminates and facing said flat plate air electrode film, a plurality of fuel gas flow passages each arranged between the adjacent flat plate laminates and facing said flat plate-like fuel electrode film, and at least air electrode films, solid electrolyte films and fuel electrode films interposed between said oxidizing gas flow passages and said fuel gas flow passages, wherein oxidizing gas supply pipes are each extended from an opening at one end of each of said oxidizing gas flow passages into the oxidizing gas flow passage, closure members are provided to each close the other end of the oxidizing gas flow passage, fuel gas supply pipes are each extended from an opening at one end of each of said fuel gas flow passages into the fuel gas flow passage, and closure members are provided to each close the other end of the fuel gas flow passage.

2. A solid oxide fuel cell according to claim 1, wherein said oxidizing gas supply pipes are supported by radial ribs on walls forming the oxidizing gas flow passages and said fuel gas supply pipes are supported by radial ribs on walls forming the fuel gas flow passages.

3. A solid oxide fuel cell according to claim 1, wherein a base portion of each of the oxidizing gas supply pipes is exposed in an oxidizing gas supply chamber and a forward end of the oxidizing gas supply pipe is fixed close to the closure member, and a base portion of each of the fuel gas supply pipes is exposed in a fuel gas supply chamber and a forward end of each of the oxidizing gas supply pipes is fixed close to the closure member.

4. A solid oxide fuel cell according to claim 1, wherein said electrode film is made of a material selected from the group consisting of $LaMnO_3$, $CaMnO_3$, $LaNiO_3$, $LaCoO_3$ and $LaCrO_3$.

5. A solid oxide fuel cell according to claim 4, wherein said electrode film is made of $LaMnO_3$ doped with strontium.

6. A solid oxide fuel cell according to claim 1, wherein said solid electrolyte film is made of yttrium stabilized zirconia.

7. A solid oxide fuel cell according to claim 1, wherein said fuel electrode film is made of a material selected from the group consisting of nickel-zirconia cermet and cobalt-zirconia cermet.

8. A solid oxide fuel cell according to claim 1, wherein said fuel gas supply pipes, said ribs and said closure members are made of the same material as that of the fuel electrode films surrounding them.

9. A solid oxide fuel cell according to claim 1, wherein said oxidizing gas supply pipes, said ribs and said closure members are made of the same material as that of the air electrode film.

* * * * *